US005671815A

United States Patent [19]

Kabatnik et al.

[11] Patent Number: 5,671,815

[45] Date of Patent: Sep. 30, 1997

[54] HAND MACHINE TOOL WITH BATTERY OPERATED DRIVE MOTOR

[75] Inventors: Wilfried Kabatnik, Leinfelden-Echterdingen; Rainer Glauning, Stuttgart, both of Germany

[73] Assignee: Robert Bosch GmbH, Stuttgart, Germany

[21] Appl. No.: 641,198

[22] Filed: Apr. 30, 1996

[30] Foreign Application Priority Data

Jun. 14, 1995 [DE] Germany ........................ 195 21 426.9

[51] Int. Cl.[6] ........................ B23B 45/02

[52] U.S. Cl. ........................ 173/217; 310/50

[58] Field of Search ........................ 173/213, 217; 310/47, 50

[56] References Cited

U.S. PATENT DOCUMENTS

| | | | |
|---|---|---|---|
| 3,734,207 | 5/1973 | Fishbein | 173/217 |
| 4,050,528 | 9/1977 | Foltz et al. | 173/217 |
| 4,930,583 | 6/1990 | Fushiya et al. | 173/217 |
| 5,054,563 | 10/1991 | Zapf | 173/217 |
| 5,553,675 | 9/1996 | Pitzen et al. | 173/217 |

FOREIGN PATENT DOCUMENTS

| | | |
|---|---|---|
| 3502449 | 2/1992 | Germany . |
| 1 515 390 | 7/1978 | United Kingdom . |

*Primary Examiner*—Scott A. Smith
*Attorney, Agent, or Firm*—Michael J. Striker

[57] ABSTRACT

A hand machine tool with a battery operated drive motor has a plug coupling for electrical contacting of the drive motor with the battery unit mounted on the hand machine tool. The coupling includes a base provided at the machine side and displaceable relative to a machine housing. The base has contact springs which are in contact with contact surfaces provided on a plug housing of the battery unit. A centering element is located between the base and the plug housing and provides a fitting abutment between the contact springs and the contact surfaces.

6 Claims, 3 Drawing Sheets

FIG. 3
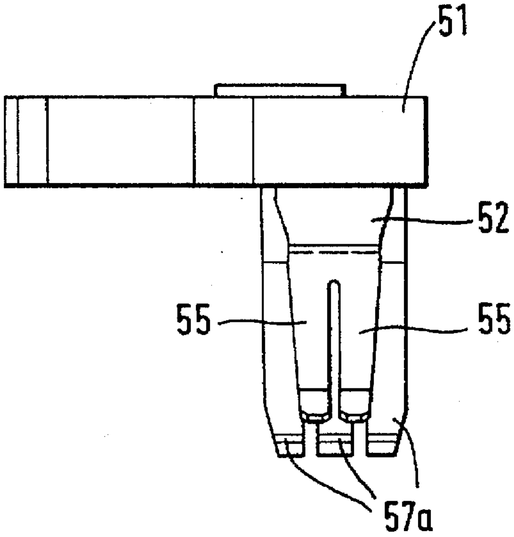
FIG. 4
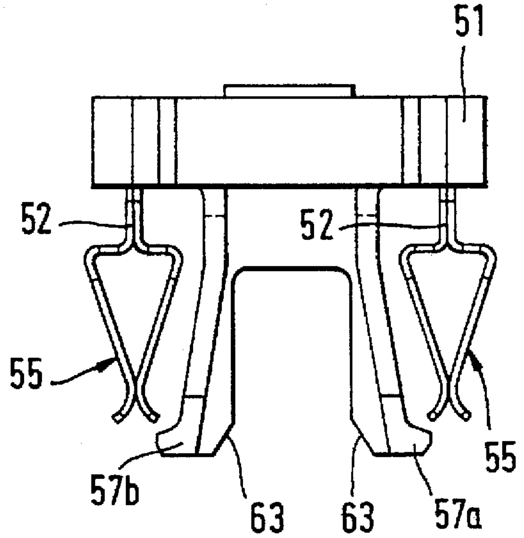
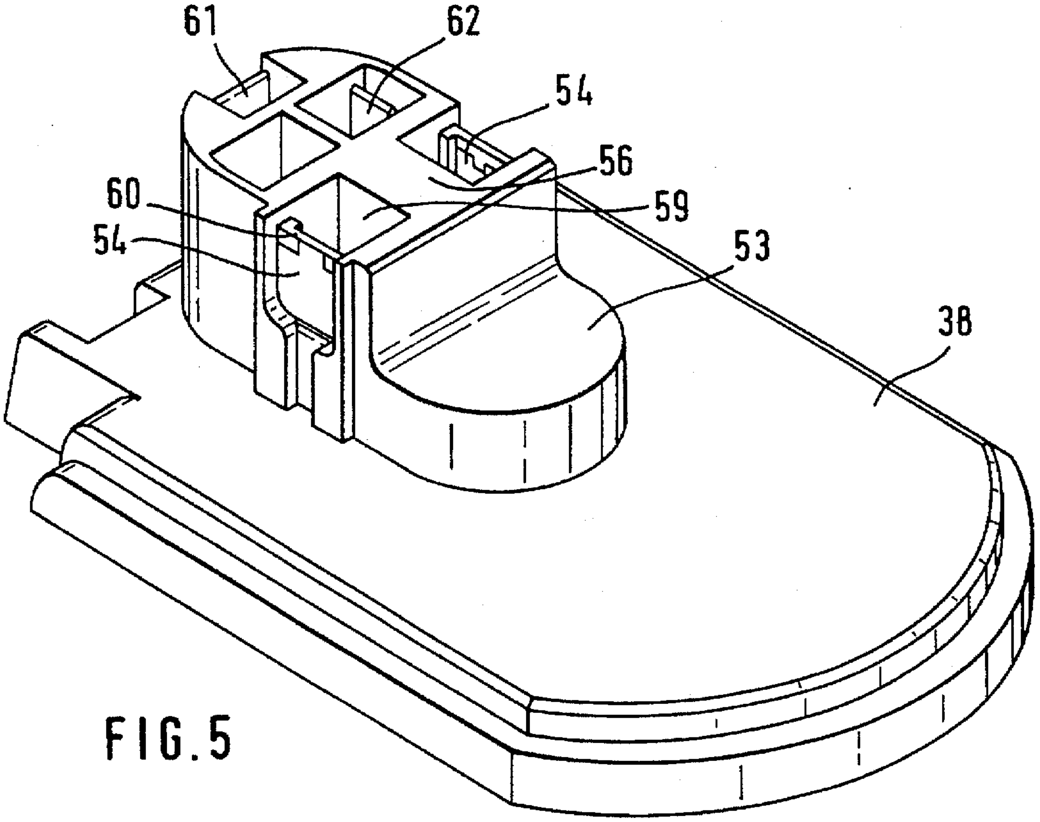
FIG. 5

HAND MACHINE TOOL WITH BATTERY OPERATED DRIVE MOTOR

BACKGROUND OF THE INVENTION

The present invention relates to a hand machine tool with a battery operated drive motor.

Such hand machine tools are known in the art. One of such hand machine tools is disclosed for example in the German document DE-35 02 449 A1. Here a battery unit is releasably mounted on the hand machine tool, and contact springs arranged on a housing base are in contact with stationary contact surfaces provided on the battery unit when the battery unit is mounted. Depending on the application of the hand machine tool, a relative movement of contact points is possible due to unavoidable guiding gaps between the battery unit and the hand machine tool. This can lead to a premature wear of the contacts.

SUMMARY OF THE INVENTION

Accordingly, it is an object of the present invention to provide a hand machine tool which avoids the disadvantages of the prior art.

In keeping with these objects and with others which will become apparent hereinafter, one feature of the present invention resides, briefly stated, in a hand machine tool in which the base is displaceable relative to the machine housing within certain limits, and a centering element is provided between the base and the battery unit so as to insure a fitting abutment of the contact springs against the contact surfaces.

When the hand machine tool is designed in accordance with the present invention, the relative movement of the contacts relative to one another is reliably prevented and therefore the contact wear is reduced and the contact difficulties are avoided.

The centering element can be formed by a centering body formed between the contact springs on the base and provided with a guiding opening, and a guiding web fixedly connected with the battery unit and engageable without gaps in the guiding opening.

The base can be transversely displaceable in the machine housing. The centering body can be provided with a leg which laterally abuts against the guiding webs when the battery unit is mounted on the machine housing. Finally, the leg of the centering body can be provided at its free end with insertion inclines for the guiding web.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3 and 4 are views showing parts of the plug connection in accordance with the present invention; and FIG. 5 is a perspective view of another part of the plug connection.

DESCRIPTION OF THE PREFERRED EMBODIMENTS

Figure 1:
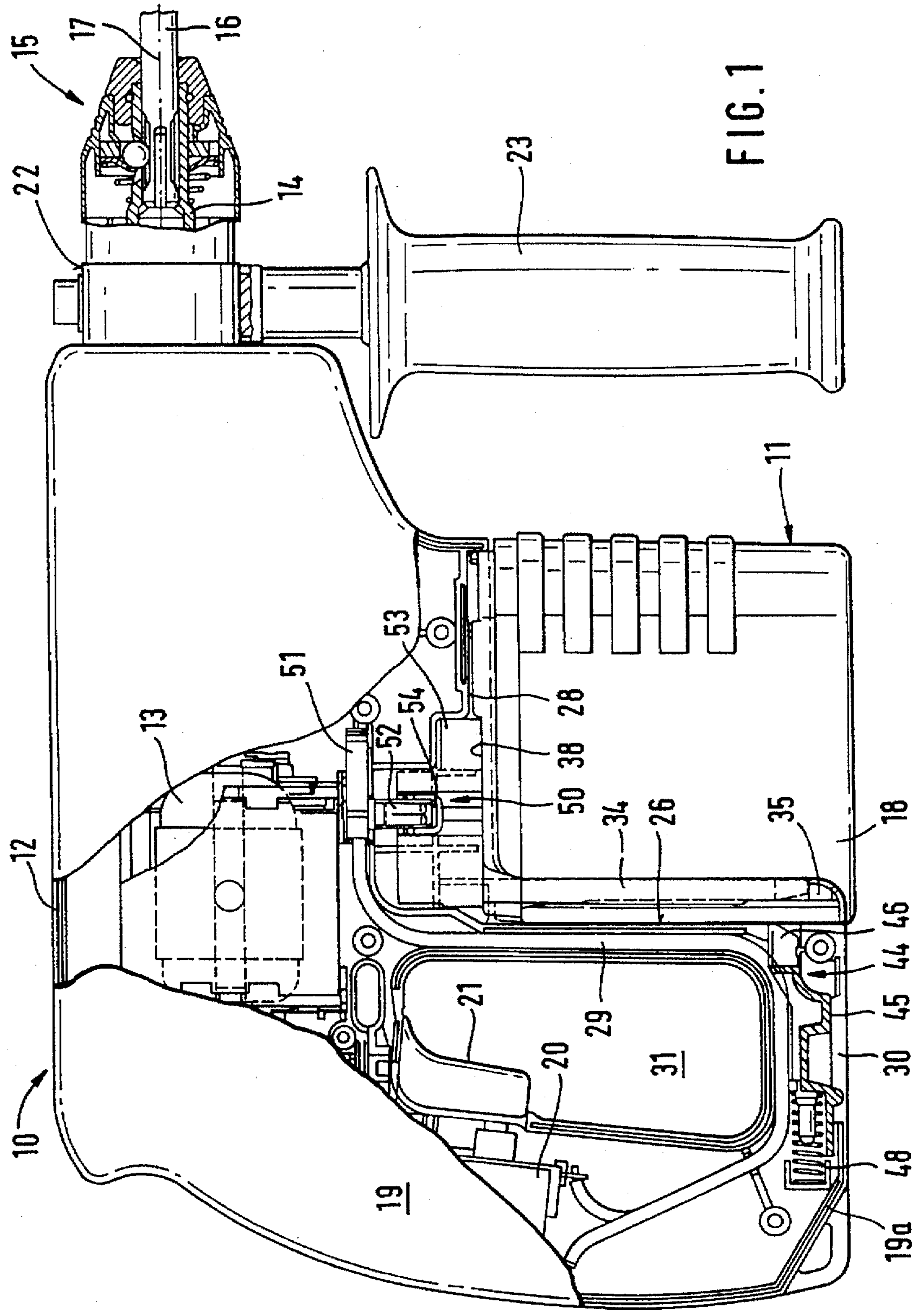
FIG. 1 is a view showing a longitudinal section of a hammer drill with a battery unit mounted on it in accordance with the present invention.

A hammer drill identified with reference numeral 10 in FIG. 1 is an example of a hand machine tool with a battery unit 11 mounted on it. The hammer drill 10 has a machine housing 12 and a battery operated drive motor 13 arranged in the machine housing. The drive motor 13 operates as a rotary drive of a drive spindle 14 which partially extends outwardly of the machine housing 12 and connected with the drive motor through a not shown transmission. Moreover, the drive motor 13 drives a tool 16 which is insertable in a tool receptacle 15 of the hammer drill 10 to deliver impacts through a not shown impact mechanism.

The machine housing 12 is separated over a separation plane extending in the plane of the drawing of FIG. 1 into two shells. A handle 19 is arranged on the machine housing 12 at the end of the hammer drill 10 which faces away from the tool receptacle 15. It is formed of one piece with the machine housing. The handle 19 is substantially pistol handle shaped and has a switch 20 with a pressing member 21. A machine housing 12 is provided with a clamping neck 22 located near the tool receptacle 15, and an auxiliary handle 23 is mounted on the clamping neck 22.

In the region between the rear handle 19 and front auxiliary handle 23, the machine housing 12 is formed for receiving the battery unit 11 which can be also identified as an accumulator. For this purpose guiding surfaces 26 are provided on the machine housing 12 forwardly of the handle 19 substantially perpendicular to a longitudinal axis 17 of the hammer drill 10, and also an abutment surface 28 extends substantially perpendicular to it under the hammer drill 10. The guiding surface 26 is formed on the housing portion 29 extending forwardly of the handle 19. At its lower end facing away from the drive motor 13, the housing portion 29 is connected through a connecting web 30 with a lower end 19*a* of the handle 19. A throughgoing opening 31 for actuation of the pressing member 21 and for holding the hammer drill 10 by an operator is provided with a handle 19, the housing portion 29 and the connecting web 30.

Guiding strips 34 extend from the guiding surface 26 for holding the battery unit 11 on the machine housing 12. Only guiding strip 34 is shown in FIG. 1. The guiding strips 34 engage in corresponding guiding grooves 35 in an accumulator housing 18 surrounding the battery unit 11. The guiding grooves 35 in the accumulator housing 18 are open upwardly, so that the battery unit 11 can be mounted from below by insertion of the guiding strips 34 into their guiding grooves 35 on the machine housing. 12 until an upper side 38 of the battery unit 11 abuts against the abutment surface 28. In this locking position of the battery unit 11 the contacts spring 52 extending from a plug connection 50 in the machine housing 12 are in electrically conductive contact with contact surfaces formed on contact plates 54 of the battery unit 11.

For locking the battery unit 11 on the machine housing 12, locking means 44 are provided. They include a slider 45 which is displaceable in the connecting web 30 and provided with arresting projections 46 extending outwardly of the guiding surface 26 of the machine housing 12. They cooperate with not shown arresting projections formed on the battery unit 11. The slider 45 is loaded by a spring 48 in direction towards its arresting position, and the spring 48 abuts against the machine housing 12. The spring 48 displaces the arresting projections 46 arranged on the slider 45 outwardly through the corresponding window of the machine housing 12, so that the arresting projections 46 in the locking position of the battery unit form-lockingly engage the counter-arresting projections. In FIG. 1 the slider 45 is in a withdrawn position in which the battery unit 10 is not locked on the machine housing 12.

The plug coupling 50 provided between the machine housing 12 and the battery unit 11 has a base 51. The base is held in the machine housing 12 and extends perpendicular to an insertion direction of the battery unit 11, or in other words, perpendicular to the plane of the drawing of FIG. 1. It is displaceable within a certain limit. The contact springs 52 are arranged on the base 51 and electrically contact the contact plate 54 formed on the plug housing 53 at both sides on the contact surfaces.

Figure 2:
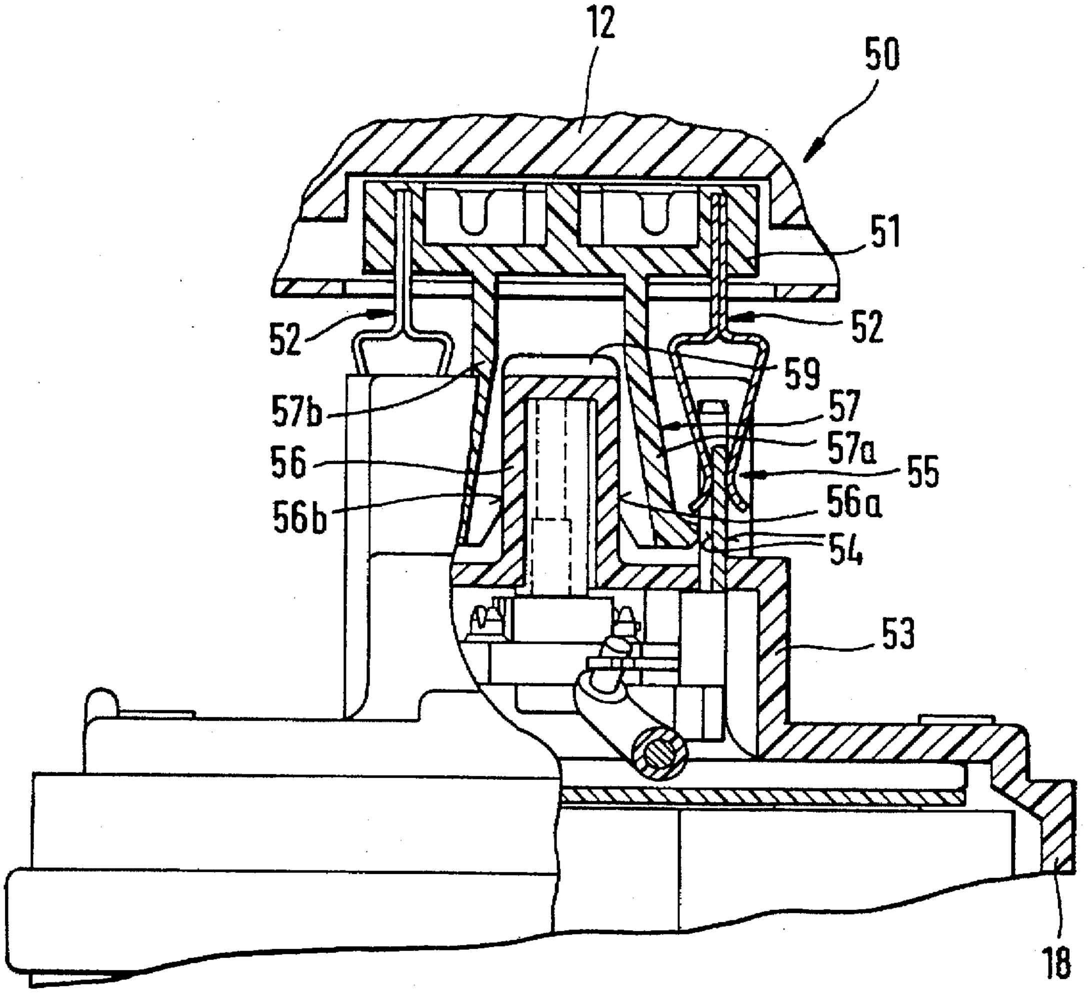
FIG. 2 is a view showing a section of a plug connection in accordance with the present invention.

The plug connection 50 is shown in FIG. 2 in detail. It can be seen that base 51 which is transversely displaceable in the machine housing 12 is provided with fixed contact spring 52. The contact springs 52 are formed as double tongues 65 which together form a two-leg receptacle for the electrically conductive contact surfaces of the contact plate 64 of the battery unit 11.

As can be seen from FIG. 3 several double tongues 55 can be arranged near one another. In the shown example the pairs of double tongues 55 are arranged near one another. FIG. 2 shows the plug housing 53 which is formed of one piece on the accumulator housing 18. A web 56 is located between the contact plates 54 on the battery unit 11 and separates the contact plates 54 from one another. The web 56 is formed by the wall of the plug housing 53 and operates for centering the transversely displaceable base 51 during mounting of the accumulator housing 18 on the machine housing 12. The centering body 57 is provided with legs 57*a, b* surrounding a guiding opening 59 and abutting against side surfaces 56*a, b* of the guiding web 56 in the mounted position of the accumulator 11. The legs 57*a, b* have free ends provided with insertion inclines 63 which are directed toward the guiding opening 59 and provided for guidance of the guiding web 56.

As can be seen from FIG. 3, the legs 57*a, b* of the centering body 57 can be longitudinally slotted to additionally improve the seat relative to the guiding web 56. Because of the transverse displaceability of the base 51, during mounting of the accumulator housing 11 on the machine housing 12 a centering between the base 51 and the plug housing 53 is obtained. When the battery unit 11 is displaced which can occur due to unavoidable guiding gaps in the guides 33, no relative movement between the contacts 52 and 54 occurs.

FIG. 5 shows the upper part of the accumulator housing 18 with the plug housing 53. The freely located contact plates 54 are provided at their edge facing the hammer drill 10 with a reinforcement 60. The guiding web 56 is arranged between the contact plates 54 and extends substantially parallel to the contact plates. Furthermore, further contacts 61, 62 are provided. They serve for example for contacting with a charging device, and no undesirable relative movements of the contacts can occur.

It is to be understood that the guiding surfaces can be also formed on other contact bodies for contacting, for example on contact pins. The contact springs can be arranged also on the battery unit 11.

It will be understood that each of the elements described above, or two or more together, may also find a useful application in other types of constructions differing from the types described above.

While the invention has been illustrated and described as embodied in a hand machine tool with battery operated drive motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand machine tool, comprising a machine housing; a drive motor; a releasably mountable battery unit for current supply of said drive motor and having contact surfaces; a coupling connection for electrical contacting of said drive motor with said battery unit, said coupling connection including a base received in said machine housing and carrying at least two contact springs arranged at a distance from one another and also contacting with said contact surfaces of said battery unit, said base being movable relative to said machine housing within a limit; and centering means provided between said base and said battery unit so as to provide a fitting abutment of said contact springs against said contact surfaces.

2. A hand machine tool as defined in claim 1, wherein said centering means includes a centering body located between said contact springs on said base and provided with a guiding opening, and a guiding web fixedly connected with said battery unit and engageable without a gap in said guiding opening.

3. A hand machine tool as defined in claim 2, wherein said centering body has legs which laterally abut against said guiding web when said battery unit is mounted on said machine housing.

4. A hand machine tool as defined in claim 3, wherein said legs of said centering body have free ends provided with insertion inclines for said guiding web.

5. A hand machine tool as defined in claim 2, wherein said battery unit has a plug housing, said guiding web being fixedly connected with said plug housing of said battery unit.

6. A hand machine tool as defined in claim 1, wherein said base is displaceable transversely in said machine housing.

* * * * *